US012652000B2

(12) United States Patent
Binzaid et al.

(10) Patent No.: US 12,652,000 B2
(45) Date of Patent: Jun. 9, 2026

(54) TECHNOLOGIES FOR SOLAR PHOTOVOLTAIC CELL DIAGNOSTIC INTEGRATED CIRCUIT

(71) Applicant: THE TEXAS A&M UNIVERSITY SYSTEM, College Station, TX (US)

(72) Inventors: Shuza Binzaid, College Station, TX (US); Abhitej Divi, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 222 days.

(21) Appl. No.: 18/660,584

(22) Filed: May 10, 2024

(65) Prior Publication Data

US 2025/0350237 A1 Nov. 13, 2025

(51) Int. Cl.
*H02S 50/10* (2014.01)

(52) U.S. Cl.
CPC .................................... *H02S 50/10* (2014.12)

(58) Field of Classification Search
CPC .......... H02S 50/10; H02S 50/15; H02S 50/00; H02S 40/30; H02S 40/32; H02S 40/34; H02S 40/00; H02S 30/00; H02S 30/10; H02S 30/20; G01R 21/06; G05F 1/67; G05F 1/10; G05F 1/66; H02J 2300/26; H02J 3/38; H02J 3/381
See application file for complete search history.

(56) References Cited

U.S. PATENT DOCUMENTS

| | | | |
|---|---|---|---|
| 2003/0034818 A1* | 2/2003 | Shenai ............... | G01R 31/3004 |
| | | | 327/218 |
| 2015/0244313 A1* | 8/2015 | McNamara .......... | H10F 77/955 |
| | | | 136/244 |
| 2020/0381918 A1* | 12/2020 | Siri ................... | H02M 3/33523 |
| 2022/0103121 A1* | 3/2022 | Adest ..................... | H10F 10/00 |

* cited by examiner

*Primary Examiner* — Alvaro E Fortich
(74) *Attorney, Agent, or Firm* — Barnes & Thornburg LLP

(57) ABSTRACT

Technologies for photovoltaic panel diagnostics include a device having a voltage sensing circuit to output a voltage detect signal when a voltage input exceeds a reference voltage and a current sensing circuit to output a current detect signal when voltage-current input exceeds a reference voltage. The voltage and voltage-current inputs may be connected to a photovoltaic solar panel. The device includes a logic driver circuit to output an unstable detect signal, a short circuit detect signal, or a normal operation signal based on the voltage detect signal and the current detect signal. Output from the logic detect circuit may be received by a resettable memory circuit, and output from the memory circuit is provided to an indicator such as a light-emitting diode or buzzer. The device may be a small application-specific integrated circuit attached to the solar panel. Other embodiments are described and claimed.

20 Claims, 7 Drawing Sheets

TECHNOLOGIES FOR SOLAR PHOTOVOLTAIC CELL DIAGNOSTIC INTEGRATED CIRCUIT

BACKGROUND

Solar power using photovoltaic (PV) cells is a common renewable energy source. Typical solar PV installations include clusters of multiple PV panels installed on rooftops, in fields, or in other locations. Over time, PV panels may require maintenance due to degradation, malfunctions, or for other reasons. Typical PV monitoring solutions may determine that a group of PV panels (e.g., a cluster of 50-100 panels) includes one or more malfunctioning panels. However, identifying the particular panels within the cluster that are malfunctioning may be difficult.

SUMMARY

According to one aspect of the disclosure, a device for photovoltaic panel diagnostics comprises a voltage input and a voltage-current input; a voltage sensing circuit to output a logic value on a voltage detect signal that is indicative of whether the voltage input exceeds a first reference voltage; a current sensing circuit to output a logic value on a current detect signal that is indicative of whether the voltage-current input exceeds a second reference voltage; and a logic driver circuit. The logic driver circuit is to output a logic high value on an unstable detect signal when the voltage detect signal is logic low and the current detect signal is logic low, and output a logic high value on a short circuit detect signal when the voltage detect signal is logic low and the current detect signal is logic high.

In an embodiment, the device is coupled to a photovoltaic panel, the voltage input is coupled to a voltage produced by the photovoltaic panel, and the voltage-current input is coupled to a voltage conversion circuit that generates a voltage indicative of electrical current produced by the photovoltaic panel. In an embodiment, a supply voltage of the device is coupled to the photovoltaic panel, and a ground of the device is coupled to the photovoltaic panel. In an embodiment, the device comprises a 10-pad die integrated circuit coupled to an 8-pin package.

In an embodiment, the logic driver circuit is further to output a logic high value on a normal operation signal when the voltage detect signal is logic high and the current detect signal is logic low. In an embodiment, the logic driver circuit comprises a first channel including a first pair of pass transistors connected in series with the unstable detect signal, the first pair of pass transistors coupled to the voltage detect signal and the current detect signal; a second channel including a second pair of pass transistors connected in series with the short circuit detect signal, the second pair of pass transistors coupled to the voltage detect signal and the current detect signal; and a third channel including a third pair of pass transistors connected in series with the normal operation signal, the first pair of pass transistors coupled to the voltage detect signal and the current detect signal. In an embodiment, the logic driver circuit comprises a 2-to-4 demultiplexer having a pair of inputs coupled to the voltage detect signal and the current detect signal and having four outputs coupled to the unstable detect signal, the short circuit detect signal, the normal operation signal, and an unused signal.

In an embodiment, the device further comprises a clock circuit to generate a clock signal, wherein the voltage sensing circuit is to output the logic value on the voltage detect signal that is indicative of whether the voltage input exceeds the first reference voltage when the clock signal is logic high, and wherein the current sensing circuit is to output the logic value on the current detect signal that is indicative of whether the voltage-current input exceeds the second reference voltage when the clock signal is logic high. In an embodiment, the voltage sensing circuit comprises a first differential amplifier having inputs coupled to the first voltage input, the first reference voltage input, and the clock signal, and having an output coupled to the voltage detect signal; and the current sensing circuit comprises a second differential amplifier having inputs coupled to the second voltage-current input, the second reference voltage input, and the clock signal, and having an output coupled to the current detect signal. In an embodiment, the device further comprises a first buffer coupled between the output of the first differential amplifier and the voltage detect signal and a second buffer coupled between the output of the second differential amplifier and the current detect signal.

In an embodiment, the device further comprises a logic gate to output a logic high value on a logic gate signal when the unstable detect signal is logic high and the short circuit detect signal is logic low or the unstable detect signal is logic low and the short circuit detect signal is logic high. In an embodiment, the logic gate comprises an exclusive-or (XOR) gate. In an embodiment, the device further comprises a reset input and an indicator output; and a memory circuit. The memory circuit is to output a value of the logic gate signal on a memory output signal and reset the memory output signal when a switch connected to the reset input is closed. The memory output signal of the memory circuit is coupled to the indicator output. In an embodiment, the memory circuit is to reset the memory output signal when the reset input is connected to ground. In an embodiment, the memory circuit comprises a 4-T static memory cell. In an embodiment, the indicator output of the device is coupled to a light emitting diode or an audio transducer.

In an embodiment, the first voltage reference and the second reference voltage are coupled to a first voltage reference input of the device.

According to another aspect, an application-specific integrated circuit for photovoltaic panel diagnostics comprises a voltage input, a voltage-current input, and a reference voltage input. The application-specific integrated circuit further comprises a first differential amplifier, a second differential amplifier, a first pair of pass transistors, and a second pair of pass transistors. The first differential amplifier has inputs coupled to the voltage input and the reference voltage input, and has an output coupled to a voltage detect signal. The second differential amplifier has inputs coupled to the voltage-current input and the reference voltage input, and has an output coupled to a current detect signal. The first pair of pass transistors are connected in series with an unstable detect signal, and the first pair of pass transistors are connected to the voltage detect signal and the current detect signal and configured to output a logic high value on the unstable detect signal when the voltage detect signal is logic low and the current detect signal is logic low. The second pair of pass transistors are connected in series with a short circuit detect signal, and the second pair of pass transistors are connected to the voltage detect signal and the current detect signal and configured to output a logic high value on the short circuit detect signal when the voltage detect signal is logic low and the current detect signal is logic high.

In an embodiment, the application-specific integrated circuit further comprises an exclusive-or logic gate having inputs coupled to the unstable detect signal and the short circuit detect signal, and having an output coupled to a logic gate signal. In an embodiment, the application-specific integrated circuit further comprises a reset input and an indicator output; and a memory circuit. The memory circuit has an input coupled to the logic gate signal and an output coupled to the indicator output. The memory circuit is to reset the memory output signal when the reset input is connected to ground.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
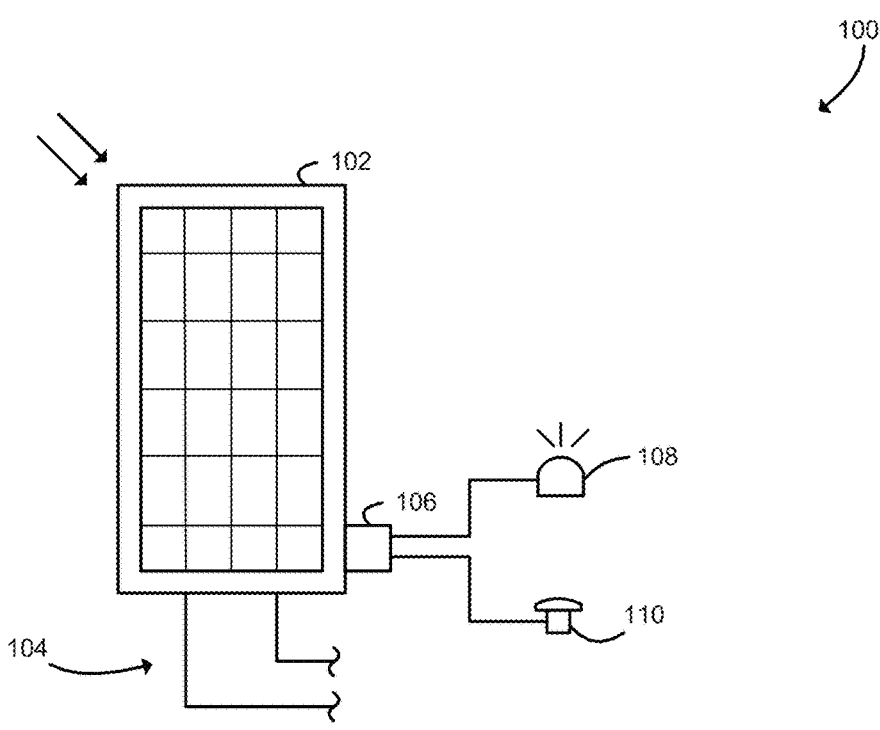
FIG. 1 is a simplified block diagram of at least one embodiment of a system with an integrated circuit for photovoltaic panel diagnostics.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims. References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C).

Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for photovoltaic panel diagnostics a photovoltaic (PV) solar panel 102 connected to a PV diagnostic circuit 106. The PV solar panel 102 generates electrical energy when exposed to sunlight. This electrical energy is output using power lines 104, which are illustratively DC power lines. The PV solar panel 102 may be connected to multiple additional PV solar panels 102, solar inverters, and/or other power management and distribution equipment (not shown).

The PV diagnostic circuit 106 is illustratively a very large scale integration (VLSI) application specific integrated circuit (ASIC) connected to the PV solar panel 102. Illustratively, as described further below, the PV diagnostic circuit 106 is embodied as a small silicon die IC included in an 8-pin package that is physically connected to the PV solar panel 102, for example on a back side or other part of the PV solar panel 102 such that the PV diagnostic circuit 106 does not obscure the PV solar cells of the PV solar panel 102. In use, as described further below, the PV diagnostic circuit 106 monitors voltage and current of the electrical power generated by the PV solar panel 102 (e.g., DC voltage and current output on the power lines 104). Based on the monitored voltage and current, the PV diagnostic circuit 106 detects whether the PV solar panel 102 is operating normally or malfunctioning (e.g., by detecting an open circuit condition or a short circuit condition). When a malfunction is detected, the PV diagnostic circuit 106 activates an indicator 108, which is illustratively a light emitting diode (LED). Additionally or alternatively, the indicator 108 may include or be embodied as multiple LEDs (e.g., one LED for normal operation, another LED for open circuit condition, and another LED for short circuit condition, which may have different colors), as an audio transducer such as a buzzer or alarm, or other indicator. The PV diagnostic circuit 106 may include a memory circuit such that the indicator 108 remains activated until the malfunction is remedied. The PV diagnostic circuit 106 is further connected to a reset switch 110, which may be used to clear the memory and thus deactivate the indicator 108 after the malfunction is remedied.

Accordingly, the system 100 allows for malfunctioning solar panels 102 to be quickly located, identified, and/or diagnosed. As compared to previous techniques, which may only identify that a cluster of solar panels includes at least one malfunctioning panel, the system 100 allows a technician to quickly and efficiently identify a particular malfunctioning solar panel 102 based on the status of the indicator 108. Additionally, compared to existing PV diagnostic systems, the PV diagnostic circuit 106 is very simple and does not require a microcontroller, software coding, or other complex control electronics. Further, the PV diagnostic circuit 106 may be powered by the PV solar panel 102 itself, which may simplify installation and reduce costs. Accordingly, the PV diagnostic circuit 106 may be manufactured as a small, inexpensive IC that can be feasibly attached to every solar panel 102 in a large solar panel installation. For example, the PV diagnostic circuit 106 may be a die-attached or packaged chip directed attached to the solar panel 102. Thus, the system 100, including the PV diagnostic circuit 106, may improve reliability and reduce costs associated with large-scale solar PV power generation.

Figure 2:
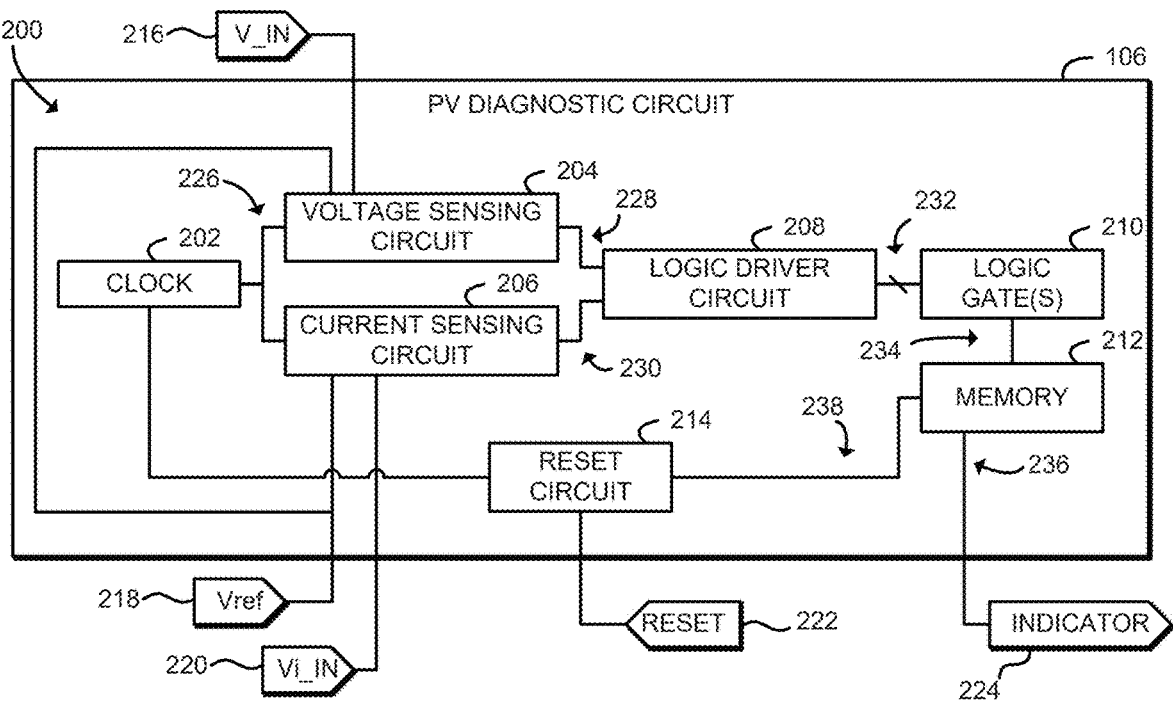
FIG. 2 is a simplified block diagram of at least one embodiment of the integrated circuit for photovoltaic panel diagnostics of the system of FIG. 1.

Referring now to FIG. 2, in the illustrative embodiment, the PV diagnostic circuit 106 includes an integrated circuit 200 that illustratively includes a clock circuit 202, a voltage sensing circuit 204, a current sensing circuit 206, a logic driver circuit 208, logic gate(s) 210, a memory circuit 212, and a reset circuit 214. The various components of the integrated circuit 200 may be embodied as one or more transistors, logic gates, amplifiers, and other circuitry or collection of electrical devices. In the illustrative embodiment, the integrated circuit 200 may be embodied as a silicon die or other VLSI integrated circuit. The integrated circuit 200 includes multiple I/O pads which may be connected to pins or other components for interfacing with other components of the system 100.

As shown, the PV diagnostic circuit 106 illustratively includes a voltage input 216, a voltage reference input 218, a voltage-current input 220, a reset input 222, and an indicator output 224. The voltage input 216 is connected to the PV solar panel 102 and receives a voltage indicative of voltage generated by the PV panel 102. The voltage reference input 218 receives a predetermined reference voltage. The voltage-current input 220 receives a voltage indicative of current generated by the PV panel 102, for example from a voltage conversion circuit such as a current sense resistor, current sense amplifier, or other circuit. The reset input 222 may be connected to the reset switch 110. The indicator output 224 may be connected to the output LED 110 or other indicator device(s).

The clock circuit 202 is configured to generate a clock signal 226, which is connected to the voltage sensing circuit 204, the current sensing circuit 206, and the reset circuit 214 and/or the memory circuit 212. The clock signal may be embodied as a buffered digital logic signal that alternates between logic high and logic low values (e.g., 0 V and 3.3 V or another set of logic values). One potential embodiment of a clock circuit 202 is described below in connection with FIG. 3.

The voltage sensing circuit 204 is configured to output a logic value on a voltage detect signal 228 that is indicative of whether the voltage input 216 exceeds a reference voltage, which may be supplied at the voltage reference input 218. The voltage sensing circuit 204 may output the voltage detect signal 228 only when the clock signal 226 is logic high. The voltage detect signal 228 may be buffered, for example by a pair of inverters or other buffer. In some embodiments, the voltage sensing circuit 204 may be embodied as a differential amplifier having inputs connected to the voltage input 216, the reference voltage input 218, and the clock signal 226, and having an output coupled to the voltage detect signal 228. One potential embodiment of a differential amplifier for the voltage sensing circuit 204 is described below in connection with FIG. 4.

The current sensing circuit 206 is configured to output a logic value on a current detect signal 230 that is indicative of whether the voltage-current input 220 exceeds a reference voltage, which may be supplied at the voltage reference 218. Although illustrated as including a single voltage reference input 218, it should be understood that in some embodiments the voltage sensing circuit 204 and the current sensing circuit 206 may be connected to separate reference voltages. The current sensing circuit 206 may output the current detect signal 230 only when the clock signal 226 is logic high. The current detect signal 230 may be buffered, for example by a pair of inverters or other buffer. In some embodiments, the current sensing circuit 206 may be embodied as a differential amplifier having inputs connected to the voltage-current input 220, the reference voltage input 218, and the clock signal 226, and having an output coupled to the current detect signal 230. One potential embodiment of a differential amplifier for the current sensing circuit 206 is described below in connection with FIG. 4.

The logic driver circuit 208 is configured to output a logic high value on an unstable detect signal 232 when the voltage detect signal 228 is logic low and the current detect signal is logic low 230, to output a logic high value on a short circuit detect signal 232 when the voltage detect signal 228 is logic low and the current detect signal 230 is logic high, and further to output a logic high value on a normal operation signal 232 when the voltage detect signal 228 is logic high and the current detect signal 230 is logic low. The logic driver circuit 208 performs a logical function as described below in Table 1. In Table 1, each "0" represents a logic low value and each "1" represents a logic high value on the corresponding input signals 228, 230. As shown, based on values of the voltage detect signal 228 and the current detect signal 230, the logic driver circuit 208 actives appropriate diagnostic signals 232 including the unstable detect signal, the normal operation signal, and the short circuit signal.

TABLE 1

| Logic driver circuit logical function. | | |
|---|---|---|
| Current Detect 230 | Voltage Detect 228 | Diagnostic Signal 232 |
| 0 | 0 | Unstable |
| 0 | 1 | Normal |
| 1 | 0 | Short Circuit |
| 1 | 1 | Ignore |

In some embodiments, the logic driver circuit 208 may include multiple channels, each including a pair of pass transistors connected in series with the respective diagnostic signal 232 and controlled by the voltage detect signal 228 and the current detect signal 230. One potential embodiment of a logic driver circuit 208 including pass transistors is described below in connection with FIG. 5. Additionally or alternatively, in some embodiments the logic driver circuit 208 may include a 2-to-4 demultiplexer having a pair of inputs connected to the voltage detect signal 228 and the current detect signal 230, and having outputs coupled to respective diagnostic signals 232. One potential embodiment of a logic driver circuit 208 including a demultiplexer circuit is described below in connection with FIG. 8.

The logic gate(s) 210 is configured to output a logic high value on a logic gate signal 234 when the unstable detect signal 232 is logic high and the short circuit detect signal 232 is logic low or the unstable detect signal 232 is logic low and the short circuit detect signal 232 is logic high. The logic gate 210 may be embodied as an exclusive-or (XOR) gate.

The memory circuit 212 is configured to output the value of the logic gate signal 234 on a memory output signal 236. The memory output signal 236 may be buffered by an inverter or other buffer component, and is connected to the indicator output 224. The memory circuit 212 in combination with the reset circuit 214 is configured to reset the memory output signal 236 when the switch 110 connected to the reset input 222 is closed. In some embodiments, the memory circuit 212 is to reset the memory output signal 236 when the reset input 222 is connected to ground. The memory circuit 212 may be embodied as a 4-T static memory cell. One potential embodiment of the memory circuit 212 and the reset circuit 214 is described below in connection with FIG. 6.

Figure 3:
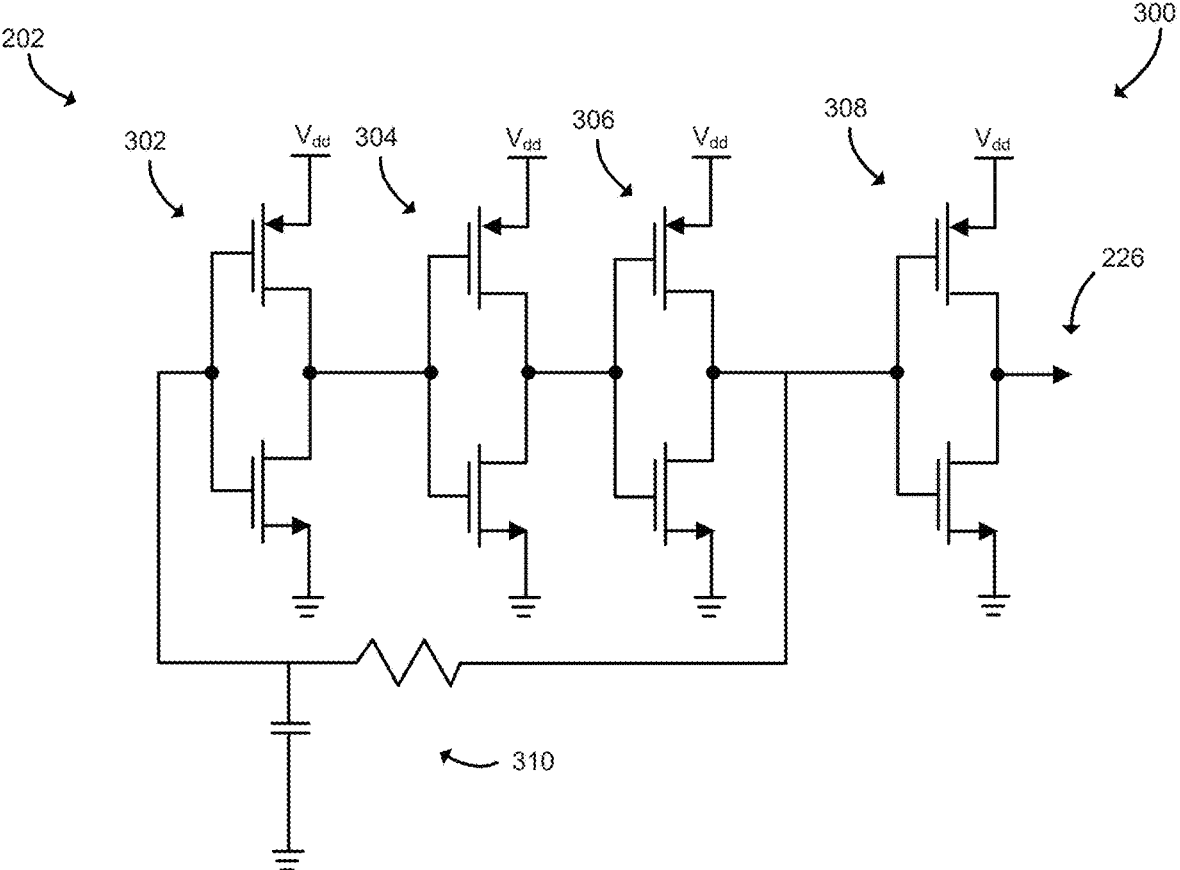
FIG. 3 is a schematic diagram of at least one embodiment of a clock circuit of the integrated circuit of FIGS. 1-2.

Referring now to FIG. 3, schematic diagram 300 illustrates one potential embodiment of the clock circuit 202. As shown, the clock circuit 202 includes four inverters 302, 304, 306, 308 connected in series. The clock circuit 300 further includes a resistor-capacitor network 310. Resistance and capacitance of the resistor-capacitor network 310 may be tuned to adjust frequency of the clock circuit 202. Output of the inverter 308 is coupled to the clock signal 226. The supply voltage Vad and ground of the clock circuit 202 may be connected to supply voltage and ground of the solar panel 102.

Figure 4:
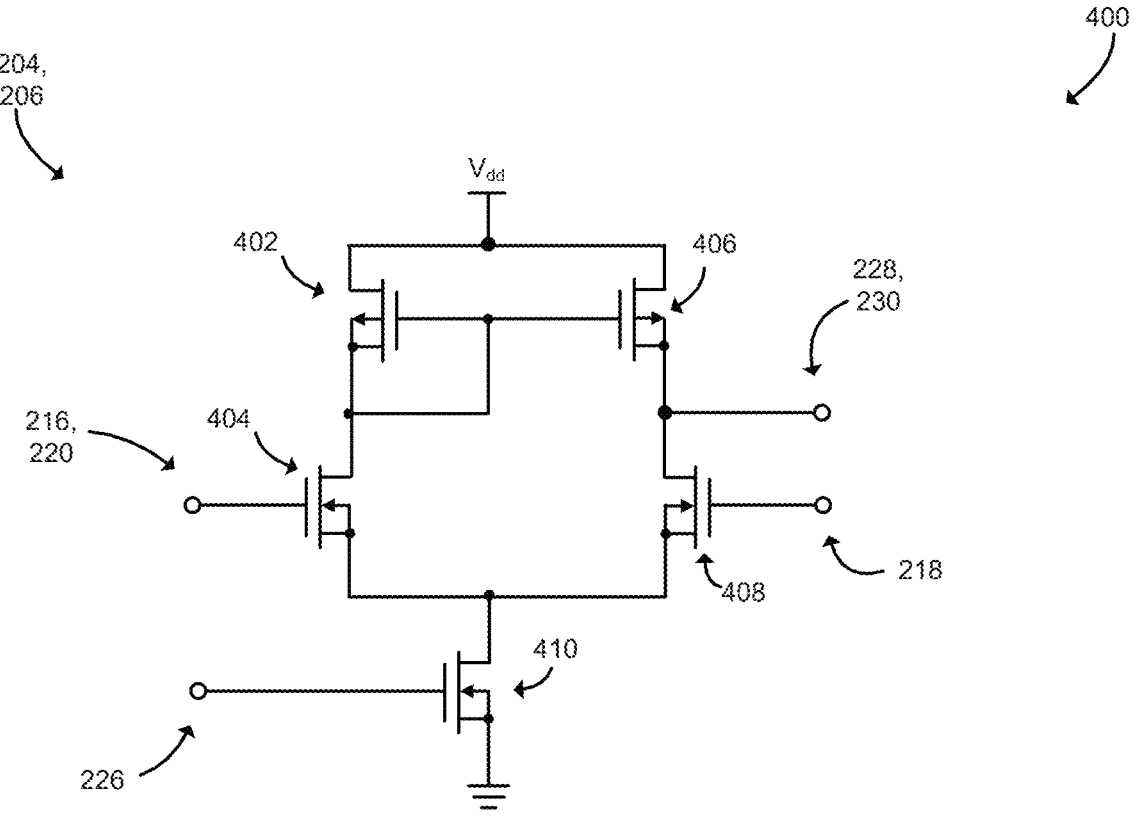
FIG. 4 is a schematic diagram of at least one embodiment of a differential amplifier circuit of the integrated circuit of FIGS. 1-2.

Referring now to FIG. 4, schematic diagram 400 illustrates one potential embodiment of a differential amplifier that may be included in the voltage sensing circuit 204 and/or the current sensing circuit 206. As shown, the differential amplifier includes four transistors 402, 404, 406, 408, 410. An input (e.g., the voltage input 216 or the voltage-current input 220) are connected to the gate of the transistor 404. The voltage reference 218 is connected to the gate of the transistor 408. The clock signal 226 is connected to the gate of the transistor 410, which enables the differential amplifier. Output from the differential amplifier is connected to a detect signal (e.g., the voltage detect signal 228 or the current detect signal 230). The supply voltage Vad and ground of the differential amplifier 400 may be connected to supply voltage and ground of the solar panel 102. In use, when the voltage of the input (e.g., the voltage input 216 or the voltage-current input 220) is higher than the reference voltage 218, the differential amplifier outputs high at the output signal (e.g., the voltage detect signal 228 or the current detect signal 230). When the voltage of the input is not higher than the reference voltage, the differential amplifier outputs a zero voltage or logic low.

Figure 5:
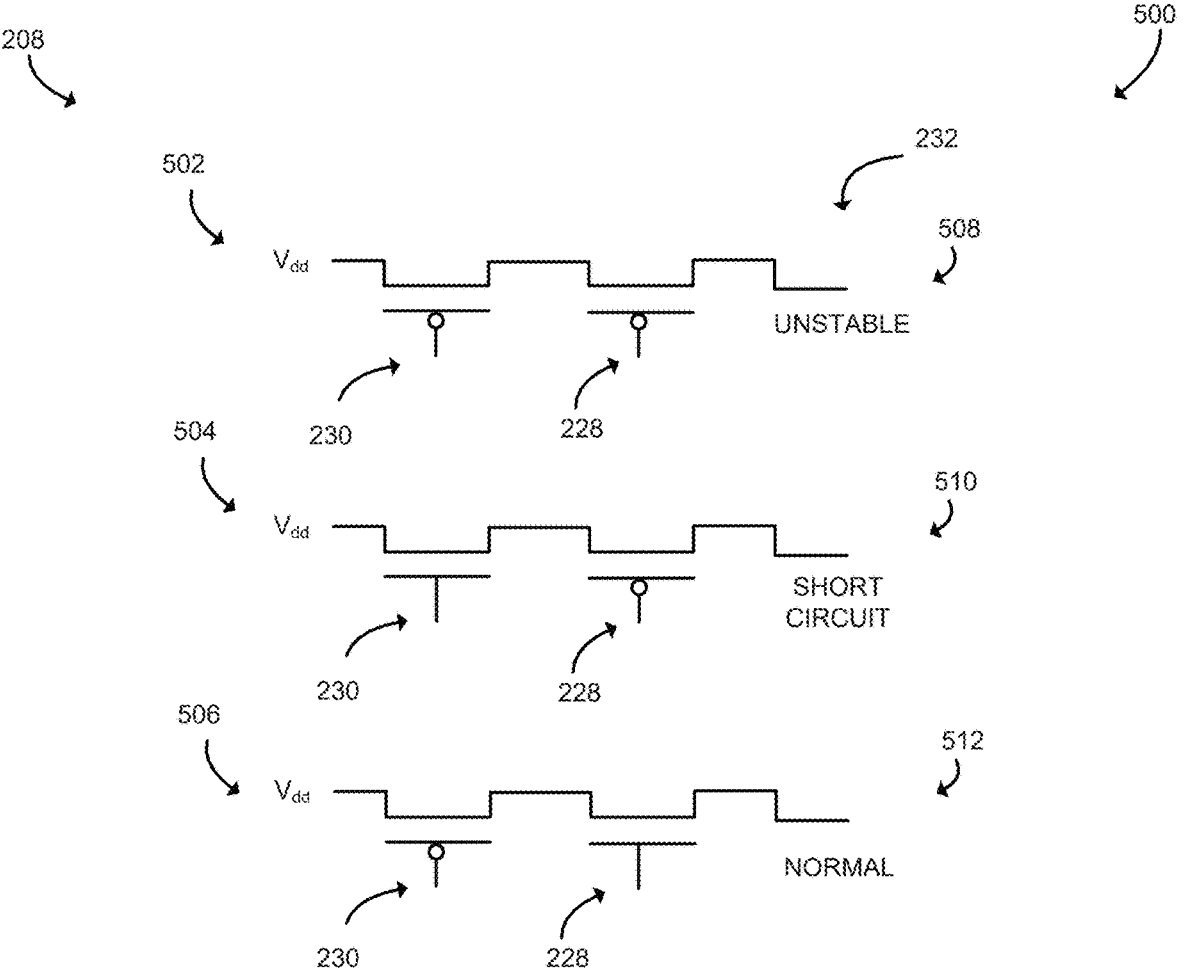
FIG. 5 is a schematic diagram of at least one embodiment of a logic driver circuit of the integrated circuit of FIGS. 1-2.

Referring now to FIG. 5, schematic diagram 500 illustrates one potential embodiment of the logic driver circuit 208. The illustrative logic driver circuit 208 includes three channels 502, 504, 506. Each channel 502, 504, 506 includes a pair of pass transistors connected in series. The pass transistors may be embodied as MOSFETs to ensure CMOS functionality. The current detect signal 230 and the voltage detect signal 228 are connected to the respective gates of each of the pair of pass transistors. Output from each of the channels 502, 504, 506 is connected to the diagnostic signals 232. In particular, the channel 502 is connected to an unstable detect signal 508, the channel 504 is connected to the short circuit detect signal 510, and the channel 506 is connected to the normal operation signal 512. As shown, when the current detect signal 230 is logic low and the voltage detect signal 228 is logic low, the unstable detect signal 508 is logic high, and otherwise the unstable detect signal 508 is not activated. Similarly, when the current detect signal 230 is logic high and the voltage detect signal 228 is logic low, the short circuit detect signal 510 is logic high, and otherwise the short circuit detect signal 510 is not activated. Further, when the current detect signal 230 is logic low and the voltage detect signal 228 is logic high, the normal operation signal 512 is logic high, and otherwise the normal operation signal 512 is not activated.

Figure 6:
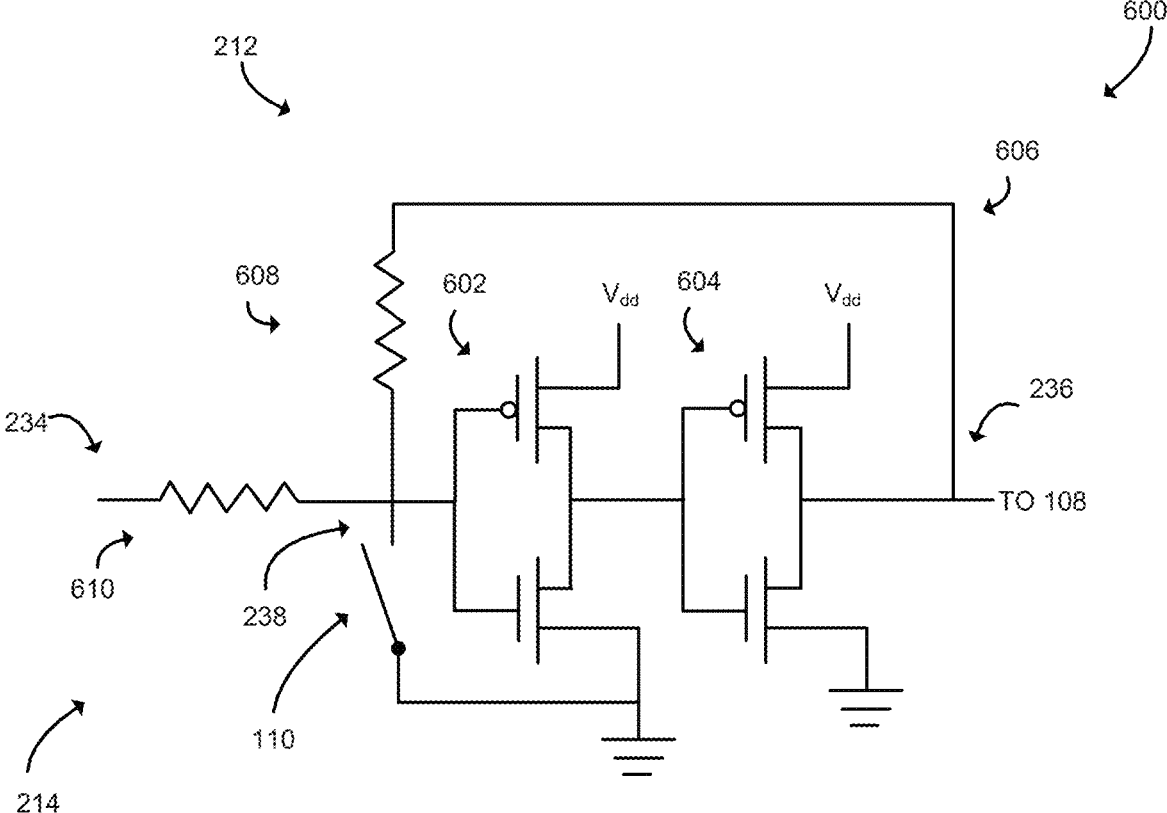
FIG. 6 is a schematic diagram of at least one embodiment of a memory and reset circuit of the integrated circuit of FIGS. 1-2.

Referring now to FIG. 6, schematic diagram 600 illustrates one potential embodiment of the memory circuit 212 and the reset circuit 214. The illustrative memory circuit 212 is a 4-T static RAM cell, and includes a pair of inverters 602, 604 and a feedback signal 606. The feedback signal 606 connects to a resistor 608. An input of the memory circuit 212 includes a resistor 610, and the logic gate signal 234 connects to this input of the memory circuit 212 at the resistor 610. The resistor 608 illustratively has a resistance value of 4 MΩ, and the resistor 610 has a resistance value of 300 kΩ. The resistors 608, 610 connect to the input of the inverter 602 and to the reset circuit signal 238. The reset circuit signal 238 is connected to the switch 110, which may selectively connect the reset circuit signal 238 to ground. In use, the logic gate signal 234 is input to the memory circuit 212, and this value is output on the memory output signal 236. The memory circuit 212 stores the value of the logic gate signal 234 such that when the logic gate signal 234 is driven logic high when a malfunction is detected, the memory output signal 236 remains logic high. The memory output signal 236 may be buffered, for example with one or more additional inverters or other buffers suitable to drive one or more LEDs, and coupled to the indicator 108 as described above. When the switch 110 is closed and the reset circuit signal 238 is connected to ground, the memory cell 212 is reset. If the logic gate signal 234 is logic low (i.e., if the malfunction has been corrected), then the memory output signal 236 returns to logic low and the indicator 108 is deactivated.

Figure 7:
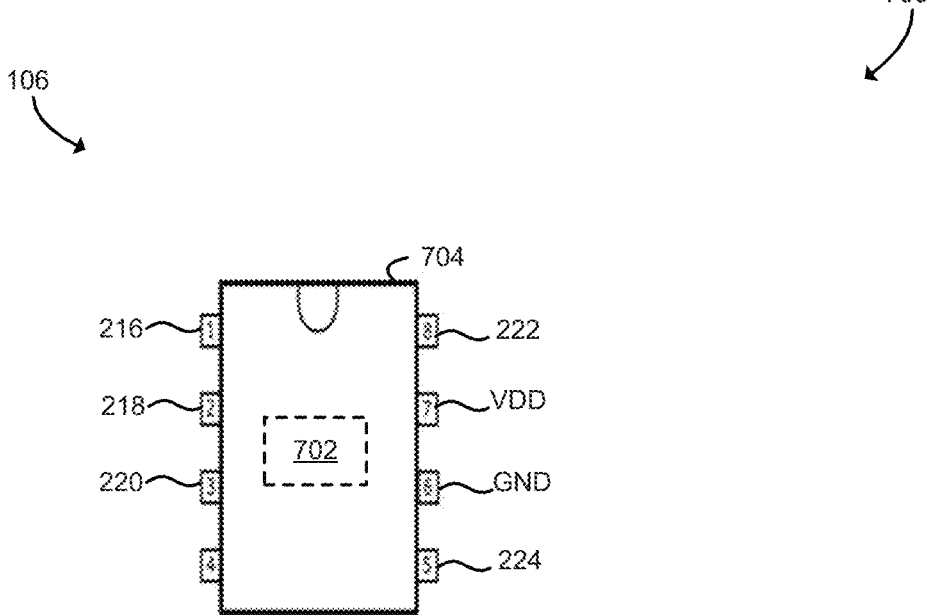
FIG. 7 is a view of a physical package including the integrated circuit of FIGS. 1-2.

Referring now to FIG. 7, diagram 700 illustrates one potential embodiment of the the PV diagnostic circuit 106. Illustratively, the PV diagnostic circuit 106 is embodied as a 10-pad silicon die 702 (including e.g., the integrated circuit 200 shown in FIG. 2) mounted in in an 8-pin dual in-line package (DIP) 704. During manufacturing, multiple dies 702 may be formed in a single wafer, which may be diced or otherwise cut to form individual PV diagnostic circuit dies 702. Accordingly, the PV diagnostic circuit 106 may be manufactured with high volume and low cost. As shown in FIG. 7, the PV diagnostic circuit 106 includes external pins to interface with the voltage input 216, the voltage reference input 218, the voltage-current input 220, the reset input 222, supply voltage VDD (+ve), ground GND (−ve), and the indictor output 224. The physical package 704 shown in diagram 700 may be attached to the PV solar panel 102, for example by epoxying or otherwise adhering the package 704 to a back side, frame, or other component of the PV solar panel 102.

Figure 8:
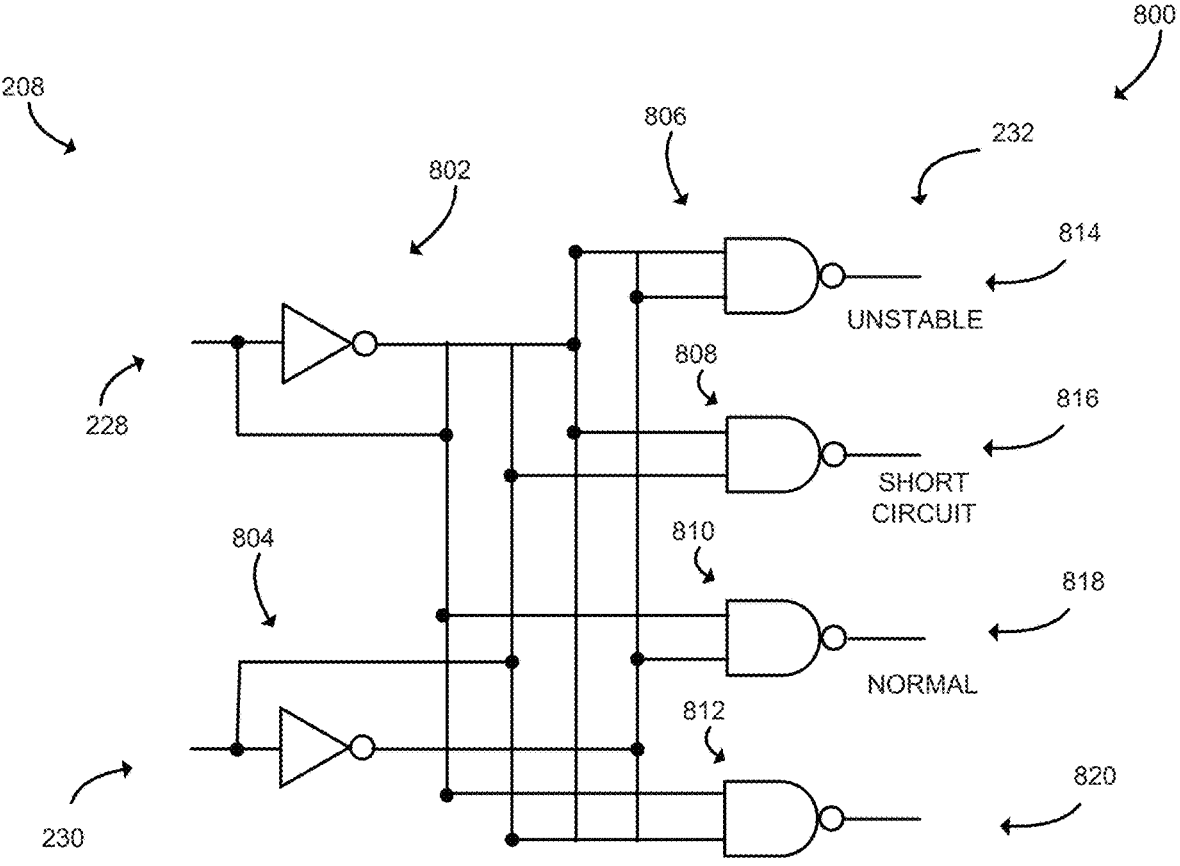
FIG. 8 is a schematic diagram of at least one alternative embodiment of the logic driver circuit of the integrated circuit of FIGS. 1-2.

Referring now to FIG. 8, schematic diagram 800 illustrates another potential embodiment of the logic driver circuit 208. The illustrative logic driver circuit 208 includes a 2-to-4 demultiplexer formed from two inverters 802, 804, and four not- and logic gates (NAND gates) 806, 808, 810, 812. The voltage detect signal 228 and the current detect signal 230 are supplied to the logic driver circuit 208 as inputs, and the logic driver circuit 208 produces the diagnostic outputs 232, which illustrative include four signals 814, 816, 818, 820. In particular, the signal 814 is the unstable detect signal 814, the signal 816 is the short circuit detect signal 816, the signal 818 is the normal operation signal 818, and the signal 820 is unused. As shown, when the current detect signal 230 is logic low and the voltage detect signal 228 is logic low, the unstable detect signal 814 is logic high, and otherwise the unstable detect signal 814 is logic low. Similarly, when the current detect signal 230 is logic high and the voltage detect signal 228 is logic low, the short circuit detect signal 816 is logic high, and otherwise the short circuit detect signal 816 is logic low. Further, when the current detect signal 230 is logic low and the voltage detect signal 228 is logic high, the normal operation signal 818 is logic high, and otherwise the normal operation signal 818 is logic low. Although illustrated as including the unused signal 820, it should be understood that in some embodiments the unused signal 820 and associated components (e.g., the NAND gate 812) may be omitted from the logic driver circuit 208.

What is claimed is:

1. A device for photovoltaic panel diagnostics comprising:
a voltage input and a voltage-current input;
a voltage sensing circuit to output a logic value on a voltage detect signal that is indicative of whether the voltage input exceeds a first reference voltage;
a current sensing circuit to output a logic value on a current detect signal that is indicative of whether the voltage-current input exceeds a second reference voltage; and
a logic driver circuit to (i) output a logic high value on an unstable detect signal when the voltage detect signal is logic low and the current detect signal is logic low, and (ii) output a logic high value on a short circuit detect signal when the voltage detect signal is logic low and the current detect signal is logic high.

2. The device of claim 1, wherein the device is coupled to a photovoltaic panel, the voltage input is coupled to a voltage produced by the photovoltaic panel, and the voltage-current input is coupled to a voltage conversion circuit that generates a voltage indicative of electrical current produced by the photovoltaic panel.

3. The device of claim 2, wherein a supply voltage of the device is coupled to the photovoltaic panel, and a ground of the device is coupled to the photovoltaic panel.

4. The device of claim 1, wherein the device comprises a 10-pad die integrated circuit coupled to an 8-pin package.

5. The device of claim 1, wherein the logic driver circuit is further to output a logic high value on a normal operation signal when the voltage detect signal is logic high and the current detect signal is logic low.

6. The device of claim 5, wherein the logic driver circuit comprises:
a first channel including a first pair of pass transistors connected in series with the unstable detect signal, the first pair of pass transistors coupled to the voltage detect signal and the current detect signal;
a second channel including a second pair of pass transistors connected in series with the short circuit detect signal, the second pair of pass transistors coupled to the voltage detect signal and the current detect signal; and
a third channel including a third pair of pass transistors connected in series with the normal operation signal, the first pair of pass transistors coupled to the voltage detect signal and the current detect signal.

7. The device of claim 5, wherein the logic driver circuit comprises a 2-to-4 demultiplexer having a pair of inputs coupled to the voltage detect signal and the current detect signal and having four outputs coupled to the unstable detect signal, the short circuit detect signal, the normal operation signal, and an unused signal.

8. The device of claim 1, further comprising a clock circuit to generate a clock signal, wherein the voltage sensing circuit is to output the logic value on the voltage detect signal that is indicative of whether the voltage input exceeds the first reference voltage when the clock signal is logic high, and wherein the current sensing circuit is to output the logic value on the current detect signal that is indicative of whether the voltage-current input exceeds the second reference voltage when the clock signal is logic high.

9. The device of claim 8, wherein:
the voltage sensing circuit comprises a first differential amplifier having inputs coupled to the voltage input, the first reference voltage input, and the clock signal, and having an output coupled to the voltage detect signal; and
the current sensing circuit comprises a second differential amplifier having inputs coup led to the second voltage-current input, the second reference voltage input, and the clock signal, and having an output coupled to the current detect signal.

10. The device of claim 9, further comprising a first buffer coupled between the output of the first differential amplifier and the voltage detect signal and a second buffer coupled between the output of the second differential amplifier and the current detect signal.

11. The device of claim 1, further comprising a logic gate to output a logic high value on a logic gate signal when the unstable detect signal is logic high and the short circuit detect signal is logic low or the unstable detect signal is logic low and the short circuit detect signal is logic high.

12. The device of claim 11, wherein the logic gate comprises an exclusive-or (XOR) gate.

13. The device of claim 11, further comprising:
a reset input and an indicator output; and
a memory circuit to (i) output a value of the logic gate signal on a memory output signal and (ii) reset the memory output signal when a switch connected to the reset input is closed;
wherein the memory output signal of the memory circuit is coupled to the indicator output.

14. The device of claim 13, wherein the memory circuit is to reset the memory output signal when the reset input is connected to ground.

15. The device of claim 13, wherein the memory circuit comprises a 4-T static memory cell.

16. The device of claim 13, wherein the indicator output of the device is coupled to a light emitting diode or an audio transducer.

17. The device of claim 1, wherein the first voltage reference and the second reference voltage are coupled to a first voltage reference input of the device.

18. An application-specific integrated circuit for photovoltaic panel diagnostics comprising:
a voltage input, a voltage-current input, and a reference voltage input;
a first differential amplifier having inputs coupled to the voltage input and the reference voltage input, and having an output coupled to a voltage detect signal;
a second differential amplifier having inputs coupled to the voltage-current input and the reference voltage input, and having an output coupled to a current detect signal;

a first pair of pass transistors connected in series with an unstable detect signal, the first pair of pass transistors connected to the voltage detect signal and the current detect signal and configured to output a logic high value on the unstable detect signal when the voltage detect signal is logic low and the current detect signal is logic low; and a second pair of pass transistors connected in series with a short circuit detect signal, the second pair of pass transistors connected to the voltage detect signal and the current detect signal and configured to output a logic high value on the short circuit detect signal when the voltage detect signal is logic low and the current detect signal is logic high.

19. The application-specific integrated circuit of claim 18, further comprising:

an exclusive-or logic gate having inputs coupled to the unstable detect signal and the short circuit detect signal, and having an output coupled to a logic gate signal.

20. The application-specific integrated circuit of claim 19, further comprising:

a reset input and an indicator output;

a memory circuit having an input coupled to the logic gate signal and an output coupled to the indicator output, wherein the memory circuit is to reset the memory output signal when the reset input is connected to ground.

* * * * *